US012601346B2

(12) United States Patent
Mayes

(10) Patent No.: US 12,601,346 B2
(45) Date of Patent: Apr. 14, 2026

(54) FLUID END OF RECIPROCATING PUMP

(71) Applicant: GD Energy Products, LLC, Tulsa, OK (US)

(72) Inventor: Adam Eugene Mayes, Tulsa, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 230 days.

(21) Appl. No.: 18/351,772

(22) Filed: Jul. 13, 2023

(65) Prior Publication Data

US 2025/0020115 A1     Jan. 16, 2025

(51) Int. Cl.

| | |
|---|---|
| *F04B 53/16* | (2006.01) |
| *B23C 5/08* | (2006.01) |
| *E21B 43/26* | (2006.01) |
| *F04B 1/00* | (2020.01) |
| *F04B 19/04* | (2006.01) |
| *F04B 19/22* | (2006.01) |
| *F04B 39/12* | (2006.01) |
| *F04B 53/00* | (2006.01) |
| *F04B 53/22* | (2006.01) |

(52) U.S. Cl.
CPC .............. *F04B 53/16* (2013.01); *E21B 43/26* (2013.01); *E21B 43/2607* (2020.05); *F04B 1/00* (2013.01); *F04B 39/122* (2013.01); *F04B 53/007* (2013.01); *F04B 53/22* (2013.01); *B23C 5/08* (2013.01); *F04B 19/04* (2013.01); *F04B 19/22* (2013.01); *Y10T 29/49236* (2015.01); *Y10T 137/7838* (2015.04); *Y10T 137/87885* (2015.04)

(58) Field of Classification Search
CPC ........ F04B 53/16; F04B 53/007; F04B 53/22; F04B 1/00; F04B 39/122; Y10T 29/49236; Y10T 137/87885; Y10T 137/7838; E21B 43/2607; E21B 43/26
See application file for complete search history.

(56) References Cited

U.S. PATENT DOCUMENTS

| | | | | |
|---|---|---|---|---|
| 8,668,470 | B2 * | 3/2014 | Bayyouk ................. | F04B 23/06 |
| | | | | 417/415 |
| D705,817 | S * | 5/2014 | Bayyouk .......................... | D15/7 |
| 9,188,123 | B2 * | 11/2015 | Hubenschmidt ...... | F04B 53/007 |
| 9,739,130 | B2 * | 8/2017 | Young ..................... | F04B 53/14 |
| 9,976,544 | B2 * | 5/2018 | Morreale ................ | F04B 53/22 |
| 10,184,470 | B2 | 1/2019 | Barnett, Jr. | |
| 11,294,402 | B1 | 4/2022 | Baskin | |
| 11,433,493 | B2 | 9/2022 | Kalyani et al. | |
| 11,708,830 | B2 * | 7/2023 | Nowell ................... | F04B 53/22 |
| | | | | 417/454 |
| 2008/0138224 | A1 | 6/2008 | Vicars | |
| 2014/0086774 | A1 | 3/2014 | Chandrasekaran et al. | |
| 2019/0178243 | A1 * | 6/2019 | Nowell ................. | F04B 53/007 |
| 2021/0372398 | A1 | 12/2021 | Chady et al. | |

* cited by examiner

*Primary Examiner* — Peter J Bertheaud
(74) *Attorney, Agent, or Firm* — Edell, Shapiro & Finnan, LLC

(57) ABSTRACT
A method of manufacturing a fluid end of a reciprocating pump, the fluid end having a main body and a flange extending from the main body, includes positioning a cutting tool between a distal surface of the flange and the main body of the fluid end so that the cutting tool can form an access area in the flange, forming, with the cutting tool, a first arcuate cutout of the access area, and forming, with the cutting tool, a second arcuate cutout of the access area, the second arcuate cutout being discontinuous with the first arcuate cutout so that the access area includes multiple radii.

16 Claims, 11 Drawing Sheets

600

602 — POSITION A CUTTING TOOL BETWEEN A DISTAL SURFACE OF A FLANGE OF A FLUID END AND A MAIN BODY OF THE FLUID END TO FORM AN ACCESS AREA IN THE FLANGE

604 — FORM A FIRST ARCUATE PORTION OF THE ACCESS AREA

606 — FORM A SECOND ARCUATE PORTION OF THE ACCESS AREA

608 — FORM A FLANGE PEAK ADJACENT TO THE ACCESS AREA

FLUID END OF RECIPROCATING PUMP

TECHNICAL FIELD

The present disclosure relates to the field of high pressure reciprocating pumps and, in particular, to a fluid end of a high pressure reciprocating pump.

BACKGROUND

High pressure reciprocating pumps are often used to deliver high pressure fluids during earth drilling operations. Generally, a reciprocating pump includes a power end and a fluid end. The power end can generate forces sufficient to cause the fluid end to deliver high pressure fluids to earth drilling operations. For example, the power end includes a crankshaft that drives a plurality of reciprocating plungers or pistons near or within the fluid end to pump fluid at high pressure. The fluid end includes a chamber in which fluid is pressurized for discharge from the reciprocating pump. The fluid end and the power end are coupled to one another via couplers, such as tie rods. In some embodiments, the fluid end includes a flange to facilitate coupling via the couplers.

SUMMARY

The present application relates to a fluid end of a reciprocating pump. The techniques discussed herein may be embodied as a method of manufacturing a fluid end and as a fluid end.

More specifically, in accordance with at least one embodiment, the present application is directed to a method of manufacturing a fluid end of a reciprocating pump, the fluid end including a casing with a main body and a flange extending from the main body. The method includes positioning a cutting tool between a distal surface of the flange and the main body of the casing so that the cutting tool can form an access area in the flange, forming, with the cutting tool, a first arcuate cutout of the access area, and forming, with the cutting tool, a second arcuate cutout of the access area, the second arcuate cutout being discontinuous with the first arcuate cutout so that the access area includes multiple radii.

In accordance with another embodiment, the present application is directed to a fluid end of a reciprocating pump. The fluid end includes a main body defining a pumping chamber, as well as a flange extending from the main body. The flange includes an access area, and the access area includes a plurality of arcuate portions and at least one access area peak separating each arcuate portion of the plurality of arcuate portions from one another such that the access area includes multiple radii.

In accordance with yet another embodiment, the present application is directed to a method of manufacturing a fluid end of a reciprocating pump. The fluid end includes a main body defining a pumping chamber, as well as a flange extending from the main body. The method includes forming a first arcuate portion of an access area, forming an access area peak of the access area, forming a second arcuate portion of the access area such that the access area peak separates the first arcuate portion and the second arcuate portion from one another, and forming a flange peak adjacent to the access area.

The foregoing advantages and features will become evident in view of the drawings and detailed description.

BRIEF DESCRIPTION OF THE DRAWINGS

To complete the description and in order to provide for a better understanding of the present application, a set of drawings is provided. The drawings form an integral part of the description and illustrate embodiments of the present application, which should not be interpreted as restricting the scope of the disclosure, but just as examples. The drawings include the following figures.

Like reference numerals have been used to identify like elements throughout this disclosure.

DETAILED DESCRIPTION

The following description is not to be taken in a limiting sense but is given solely for the purpose of describing the broad principles of the disclosure. Embodiments of the disclosure will be described by way of example, with reference to the above-mentioned drawings showing elements and results according to the present disclosure.

Generally, the present application is directed to a fluid end of a reciprocating pump. The fluid end includes a main body defining a pumping chamber and a flange configured to couple to a power end of the reciprocating pump. For example, couplers connected to the power end are configured to extend through the flange to couple the fluid end and the power end to one another. The flange includes access areas or spaces to enable the couplers to be accessed for securement to the flange. Each access area includes a first arcuate portion and a second arcuate portion that are separated from one another by an access area peak. Thus, each access area includes multiple radii. Additionally, the access areas are separated from one another by a flange peak. Among other advantages, the multiple radii may carefully contour the access areas to ease installation of couplers to the flange. Additionally or alternatively, forming access areas with multiple radii may improve the efficiency of manufacturing.

To form the access area, a cutting tool may be used to remove material from the flange. Thus, the access area is a cutout of the flange. The cutting tool is directed along a movement path to form the first arcuate portion, the second arcuate portion, and the access area peak between the first arcuate portion and the second arcuate portion. As an example, the cutting tool is directed along a first portion of the movement path to form the first arcuate portion and along a second portion of the movement path to form the second arcuate portion. Between the first portion and the second portion of the movement path, the cutting tool is directed along an intermediate portion to form the access area peak. Such formation of the access area may enable the couplers (e.g., couplers of a sufficient size) to be desirably implemented to couple the fluid end and the power end to one another, while providing sufficient structural rigidity of the fluid end. For example, by forming the access area peak between the arcuate portions, the amount of material removed from the flange may be limited. Thus, the flange may have relatively more material as compared to a flange with an access area that has a single, continuous arcuate portion, thereby providing relatively increased strength.

Figure 1:
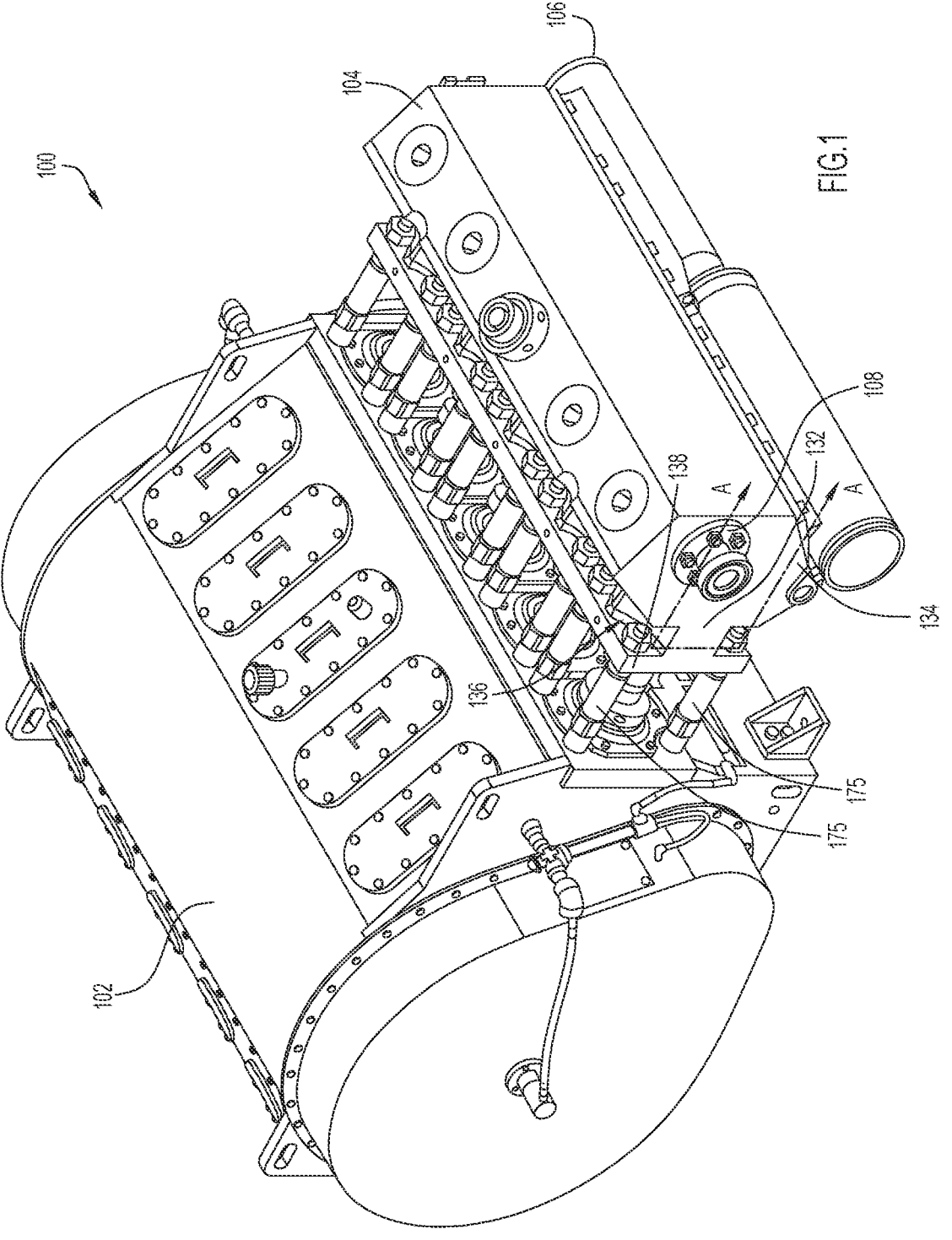
FIG. 1 is a front perspective view of a reciprocating pump including a fluid end and a power end.

Referring to FIG. 1, a reciprocating pump 100 is illustrated. The reciprocating pump 100 includes a power end 102 and a fluid end 104. The power end 102 includes a crankshaft that drives a plurality of reciprocating plungers or pistons (generally referred to as "reciprocating elements") within the fluid end 104 to pump fluid at high pressure (e.g., to cause the fluid end 104 to deliver high pressure fluids to earth drilling operations). For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting, and the present application may be applicable to both fracking and drilling operations, as well as any other suitable operations.

In FIG. 1, the power end 102 and the fluid end 104 are coupled to one another via couplers 175, shown as tie rods or stay rods in the illustrated embodiment. The couplers 175 maintain a target distance (e.g., cradle) between the power end 102 and the fluid end 104. By way of example, the couplers 175 enable a desirable length of the plungers of the power end 102 to extend into the fluid end 104 to pump fluid in a desirable manner (e.g., to provide a target discharge pressure, to direct fluid at a target rate). The couplers 175 are secured to the power end 102 and extend through a portion of the fluid end 104 to secure to the fluid end 104. More specifically, the fluid end 104 includes a flange 132, and the couplers 175 are inserted through a portion of the flange 132 to secure the couplers 175 to the fluid end 104. As an example, the flange 132 extends away from a main body 134 of the fluid end 104, and the flange 132 includes an access area 136 (e.g., a recess, a trough) to define a lip 138 offset from the main body 134. That is, the access area 136 includes a space between the lip 138 and the main body 134. The couplers 175 extend through the lip 138 and terminate within the access area 136. Thus, the couplers 175 are readily accessible via the access area 136, such as to adjust the securement of the couplers 175 to the fluid end 104. The fluid end 104 may include separate access areas 136 to facilitate access to different sets of couplers 175. When these access areas 136 are formed in accordance with the techniques presented herein, each access area 136 may include multiple arcuate portions or cutouts, and therefore multiple radii.

Figure 2A:
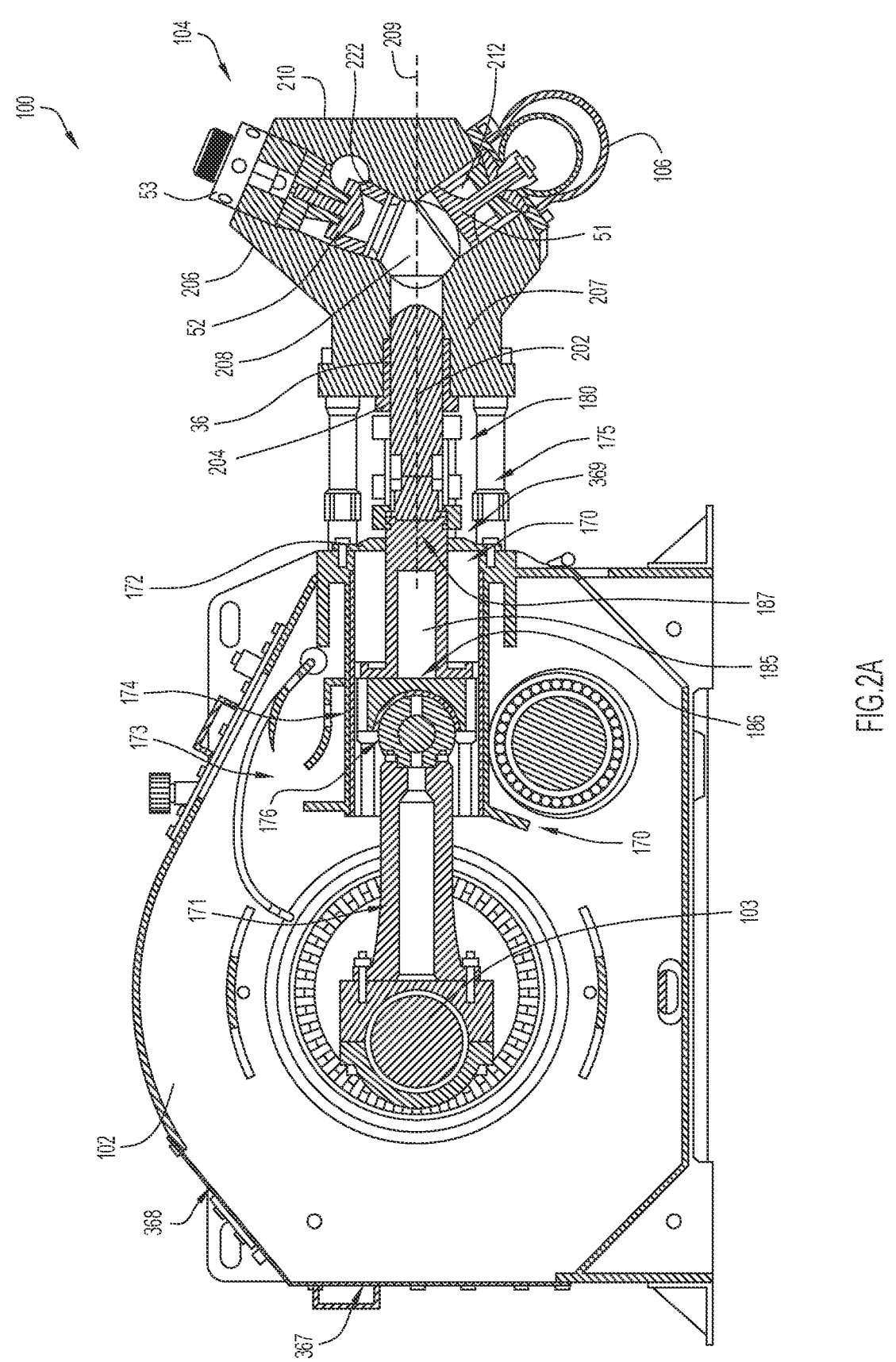
FIG. 2A is a side cross-sectional view of the reciprocating pump of FIG. 1.

Still referring to FIG. 1, but now in combination with FIG. 2A, the reciprocating pump 100 pumps fluid into and out of pumping chambers 208. FIG. 2A shows a side, cross-sectional view of reciprocating pump 100 taken along a central axis 209 of one of the reciprocating elements 202 included in reciprocating pump 100. Thus, FIG. 2A depicts a single pumping chamber 208. However, it should be understood that a fluid end 104 can include multiple pumping chambers 208 arranged side-by-side. In fact, in at least some embodiments (e.g., the embodiment of FIG. 1), a casing 206 of the fluid end 104 forms a plurality of pumping chambers 208, and each pumping chamber 208 includes a reciprocating element 202 that reciprocates within the casing 206. However, side-by-side pumping chambers 208 need not be defined by a single casing 206. For example, in some embodiments, the fluid end 104 may be modular, and different casing segments may house one or more pumping chambers 208. In any case, the one or more pumping chambers 208 are arranged side-by-side so that corresponding conduits are positioned adjacent to each other and generate substantially parallel pumping action. Specifically, with each stroke of the reciprocating element 202, low pressure fluid is drawn into the pumping chamber 208 and high pressure fluid is discharged.

In various embodiments, the fluid end 104 may be shaped differently and/or have different features, but may still generally perform the same functions, define similar structures, and/or house similar components. For example, while fluid end 104 includes a first bore 204 that intersects an inlet bore 212 and an outlet bore 222 at skewed angles, other fluid ends may include any number of bores arranged along any desired angle or angles, for example, to intersect bore 204 (and/or an access bore) substantially orthogonally and/or so that two or more bores are substantially coaxial. Generally, bores 212 and 222, as well as any other bores (i.e., segments, conduits, etc.), may intersect to form a pumping chamber 208, may be cylindrical or non-cylindrical, and may define openings at an external surface 210 of the casing 206. Additionally, bores 212 and 222, as well as any other bores (i.e., segments, conduits, etc.), may receive various components or structures, such as sealing assemblies or components thereof.

In the depicted embodiment, inlet bore 212 defines a fluid path through the fluid end 104 that connects the pumping chamber 208 to a piping system 106 delivering fluid to the fluid end 104. Meanwhile, outlet bore 222 allows compressed fluid to exit the fluid end 104. Thus, in operation, bores 212 and 222 may include valve components 51 and 52, respectively, (e.g., one-way valves) that allow bores 212 and 222 to selectively open and deliver a fluid through the fluid end 104. Typically, valve components 51 in the inlet bore 212 may be secured therein by a piping system 106 (see FIG. 1). Meanwhile, valve components 52 in outlet bore 222 may be secured therein by a closure assembly 53 that, in the example illustrated in FIG. 2A, is removably coupled to the fluid end 104 via threads.

In operation, fluid may enter fluid end 104 via outer openings of inlet bores 212 and exit fluid end 104 via outer openings of outlet bores 222. More specifically, fluid may enter inlet bores 212 via pipes of piping system 106, flow through pumping chamber 208 (due to reciprocation of reciprocating elements 202), and then flow through outlet bores 222 into a channel 108 (see FIG. 1). However, piping system 106 and channel 108 are merely example conduits/manifolds and, in various embodiments, fluid end 104 may receive and discharge fluid via any number of pipes and/or conduits, along pathways of any desirable size or shape.

Meanwhile, each of bores 204 defines, at least in part, a cylinder for reciprocating elements 202 and/or connects the casing 206 to a cylinder for reciprocating elements 202. More specifically, in the illustrated embodiment, a casing segment 207 houses a packing assembly 36 configured to seal against a reciprocating element 202 disposed interiorly of the packing assembly 36. Reciprocation of a reciprocating element 202 in or adjacent to bore 204, which may be referred to as a reciprocation bore (or, for fracking applications, a plunger bore), draws fluid into the pumping chamber 208 via inlet bore 212 and pumps the fluid out of the pumping chamber 208 via outlet bore 222. To help provide access to these parts and/or the pumping chamber 208, such as for performing maintenance operations, some fluid ends 104 have access bores that are often aligned with (and sometimes coaxial with) the reciprocating bore 204. Other fluid ends 104 need not include an access bore and, thus, such an access bore is not illustrated in FIGS. 1 and 2A.

Regardless of whether the fluid end 104 includes an access bore, the packing assembly 36 is typically replaced from an outer opening of bore 204 (i.e., a side of bore 204 aligned with the external surface 210 of the casing 206). At the same time, to operate properly, the fluid end 104 is to be securely and stably coupled to the power end 102. Thus, at least a portion of the reciprocating pump 100, such as the couplers 175, is often disassembled to allow access to bore 204, e.g., to replace packing assembly 36.

Figure 2B:
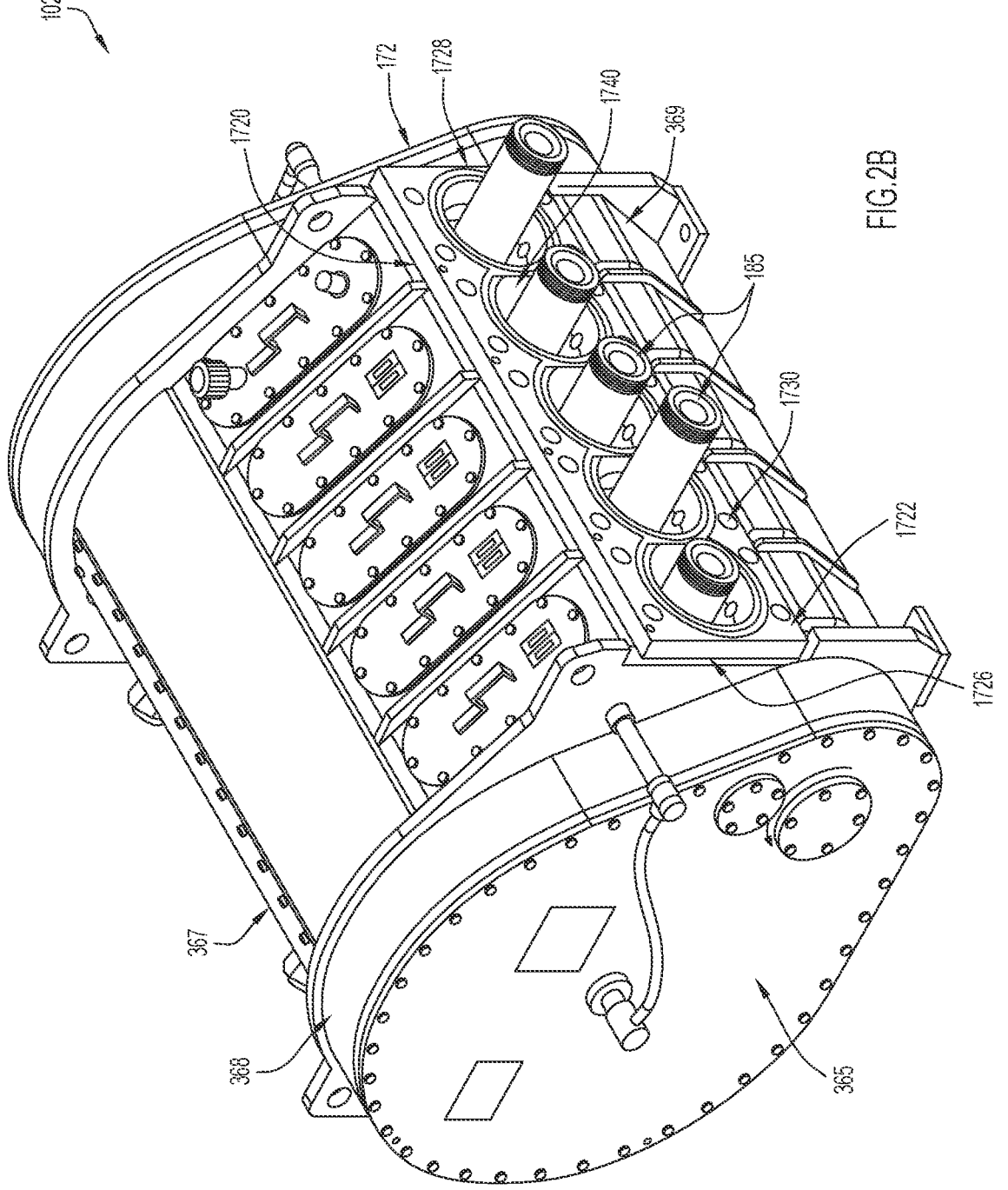
FIG. 2B is a front perspective view of the power end of FIG. 1.

Now turning to FIGS. 2A and 2B, in the depicted reciprocating pump 100, the couplers 175 are threaded to a nose plate 172 of a crosshead assembly 170 of the power end 102 to position the fluid end 104 in close proximity to the power end 102. More specifically, with the power end 102, the locations at which a fluid end 104 may be coupled to the power end 102 are fixed and/or preset by a set of receptacles 1730. In this particular power end 102, the nose plate 172 defines the locations of receptacles 1730 for the power end 102 (which is positioned at and/or generally defines a front of the power end 102). However, in other embodiments, receptacles 1730 could be included in any part or portion of a power end. That is, the power end 102 may include a frame 368 that extends from a front 369 to a back 367, and the receptacles 1730 may generally be included in the front 369 of frame 368. Receptacles 1730 can be seen in FIG. 2B, which shows the power end 102 disconnected from the fluid end 104, e.g., during maintenance of the packing assembly 36 included in the fluid end 104. FIG. 2B also shows how, in this particular embodiment, the nose plate 172 extends from a first end 1726 to a second end 1728 and also extends from a back surface 1720 to a front surface 1722.

Generally, in power ends 102 that include a nose plate 172, the nose plate 172 is installed or formed in the power end 102 by forming the nose plate 172 with the frame 368, irremovably welding the nose plate 172 to the frame 368, or otherwise irremovably coupling the nose plate 172 to the frame 368. Once installed, the first end 1726 of the nose plate 172 is positioned proximate to a first side 365 of the frame 368 of the power end 102 (e.g., aligned with a housing for a main roller and pinion) and the second end 1728 of the nose plate 172 is positioned proximate a second side 366 (see, e.g., FIG. 4A) of the frame 368 (e.g., aligned with a housing for a main roller and pinion). Meanwhile, the back surface 1720 of the nose plate 172 faces and/or defines the front 469 of frame 368. In fact, in some instances, the nose plate 172 encloses a crosshead frame 174 of the crosshead assembly 170 (but does not necessarily do so in all power ends).

In the depicted embodiment, the receptacles 1730 extend into the nose plate 172 from the front surface 1722 and are generally disposed around pony rod holes 1740. However, in other embodiments, the receptacles 1730 need not be positioned as such. In any case, the receptacles 1730 may be threaded so that a threaded coupler 175 can be secured directly therein. Still further, in some instances, receptacles 1730 need not extend through back surface 1720, which may prevent couplers 175 from extending into the crosshead assembly 170 and interfering with operations of the crosshead assembly 170 and/or allowing contaminants into the crosshead assembly 170. However, other embodiments might include receptacles 1730 that are through holes.

Still referring to FIGS. 2A and 2B, in the reciprocating pump 100—and in most high pressure reciprocating pumps—the crosshead frame 174 is a part of a crosshead assembly 170 that converts rotational motion of the crankshaft 103 into linear, reciprocating motion of a pony rod 185. More specifically, the crosshead assembly 170 includes a connecting rod 171, a crosshead 173, and a pony rod 185. The crosshead 173 includes a connector 176 disposed within a crosshead frame 174, and the connecting rod 171 extends from the crankshaft 103 to the connector 176. The connector 176 is configured to move linearly within the crosshead frame 174, and opposite ends of the connecting rod 171 are configured to travel with the crankshaft 103 and the connector 176.

Thus, as the connecting rod 171 rotates with the crankshaft 103, the connecting rod 171 reciprocates the connector 176 within the crosshead frame 174. The connector 176 is also connected to a back side 186 of the pony rod 185 so that the pony rod 185 reciprocates with the connector 176. Meanwhile, a front side 187 of the pony rod 185 can be coupled to a reciprocating element 202 (e.g., a plunger), such as via a clamp, to drive reciprocating motion of the reciprocating element 202 that pumps fluid through the fluid end 104.

Figure 3A:
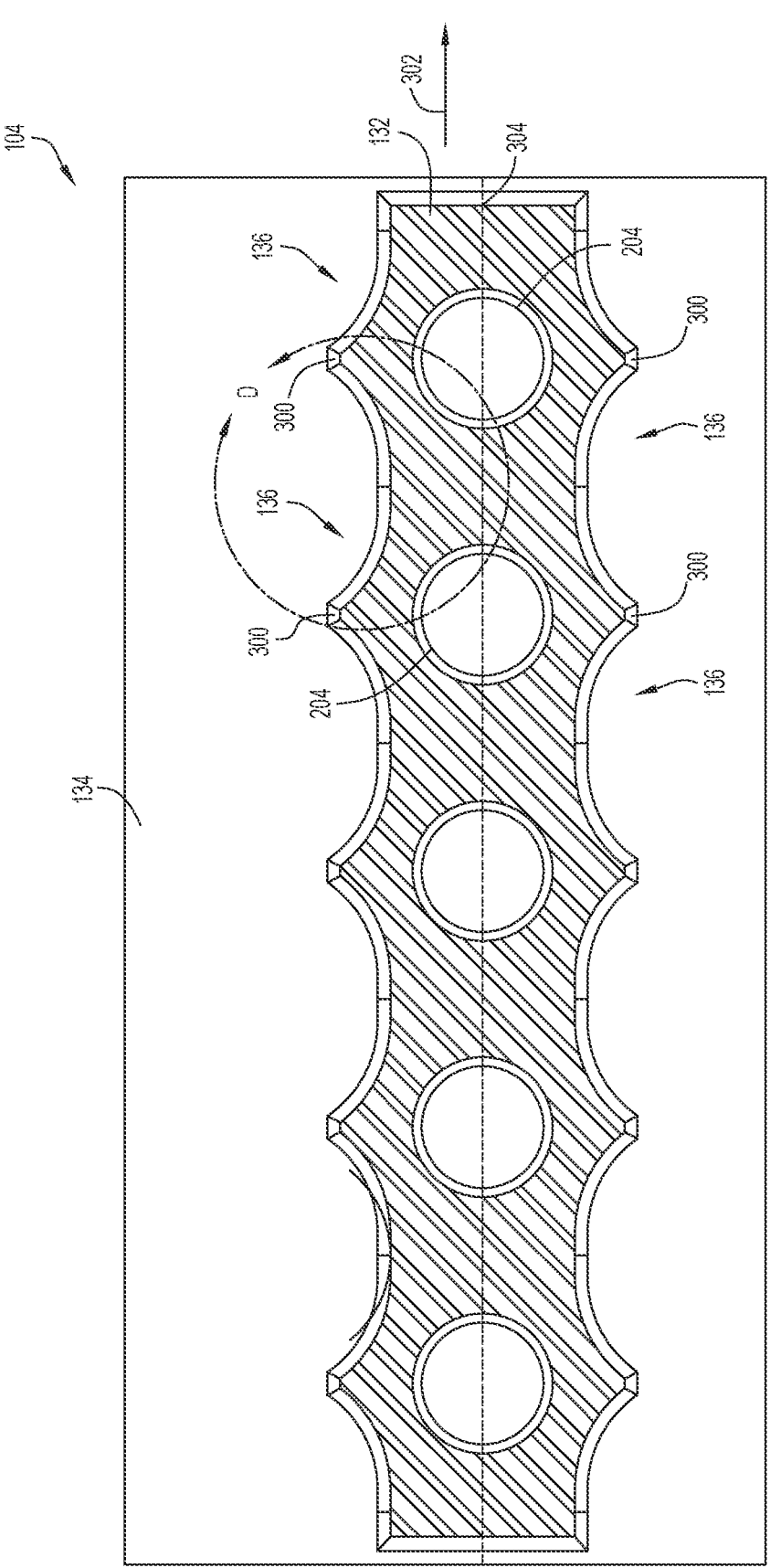
FIG. 3A is a cross-sectional view of a fluid end of the reciprocating pump of FIG. 1 taken along line A-A of FIG. 1.

Now turning to FIG. 3A, which illustrates a front cross-sectional view of the fluid end 104 of the reciprocating pump 100, but with continued reference to FIG. 1. The fluid end 104 includes the main body 134 and the flange 132 extending from the main body 134. The flange 132 includes multiple access areas 136 to accommodate positioning of the couplers 175. For example, one or more couplers 175 extend through the lip 138 and are accessible within the access areas 136. That is, the access areas 136 provide a space between the lip 138 and the main body 134 into which the couplers 175 extend (e.g., terminate).

Each access area 136 is separated from an adjacent access area via a respective flange peak 300 (e.g., a plateau, a summit, a crest, webbing). In the illustrated example, the first bores 204 formed through the flange 132 are offset from one another along a first axis 302 (e.g., a horizontal axis, a lateral axis), and each flange peak 300 overlaps with a corresponding first bore 204 along the first axis 302. Thus, each flange peak 300 extends away from a corresponding first bore 204. As a result, the flange 132 (e.g., the flange peaks 300) may better absorb stress originating from the first bores 204 (e.g., via force imparted by the reciprocating element 202 and/or by fluid within the first bores 204) to maintain a structural integrity of the flange 132.

Figure 3B:
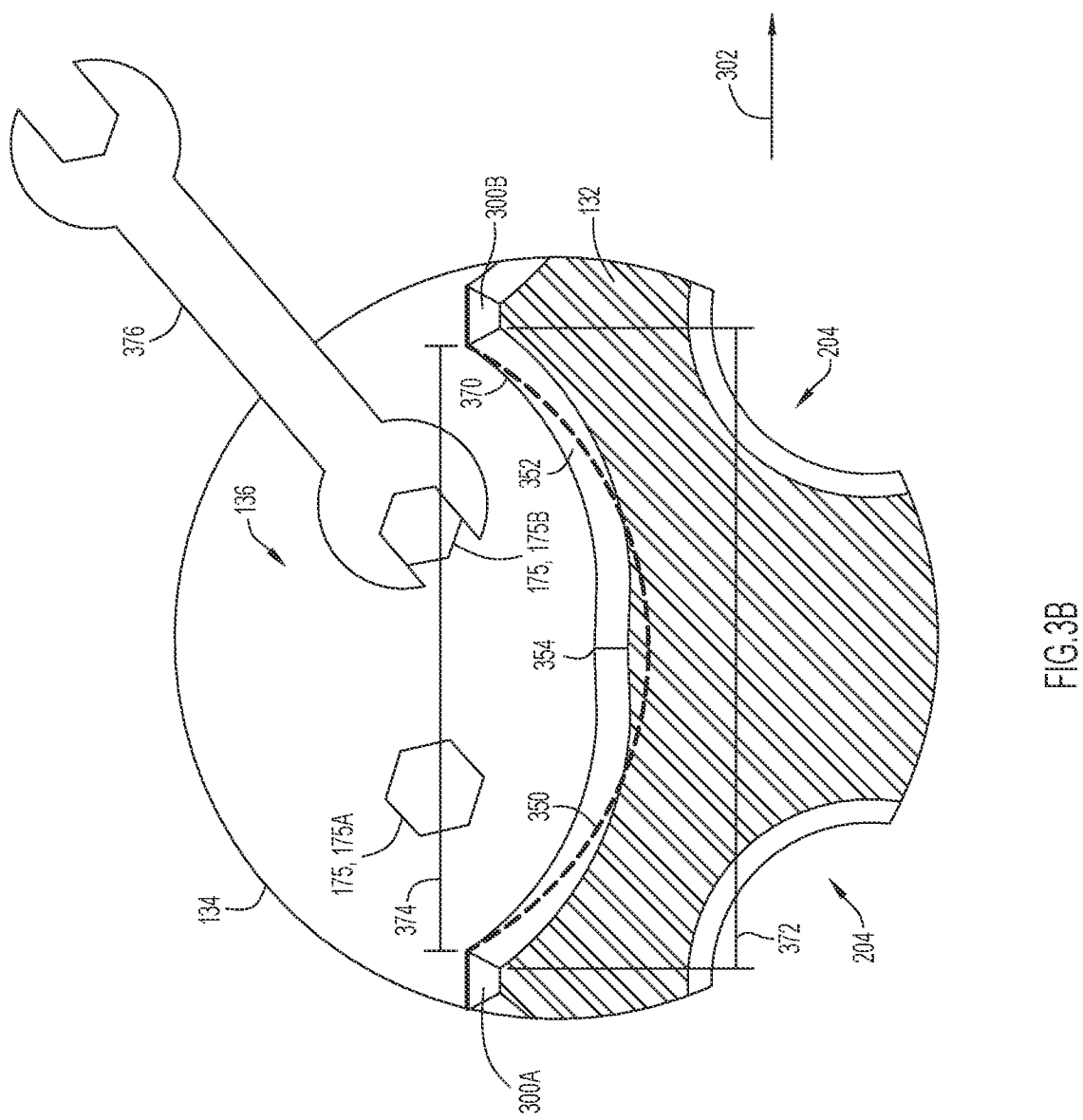
FIG. 3B is a detailed cross-sectional view of the fluid end of the reciprocating pump of FIG. 1.

FIG. 3B is a detailed cross-sectional view of the fluid end 104 further illustrating one of the access areas 136. The access area 136 includes a first arcuate portion 350 and a second arcuate portion 352. Thus, the access area 136 may have a double scalloped configuration. The first arcuate portion 350 and the second arcuate portion 352 are separated from one another via an access area peak 354. In other words, the access area peak 354 provides a geometric discontinuity that separates the first arcuate portion 350 and the second arcuate portion 352 from one another. Consequently, the access area 136 includes multiple radii—one associated with the first arcuate portion 350 and another associated with the second arcuate portion 352. In some embodiments, the radius of the first arcuate portion 350 and the radius of the second arcuate portion 352 are substantially equal to one another. In additional or alternative embodiments, the radius of the first arcuate portion 350 and the radius of the second arcuate portion 352 are different from one another.

In the illustrated embodiment, the access area peak 354 is positioned between adjacent first bores 204 along the first axis 302. For this reason, the positioning of the access area peak 354 away from the first bores 204 may reduce propagation of stress from the first bores 204 (e.g., as imparted by the reciprocating element 202) to the access area peak 354. Consequently, a structural integrity of the access area peak 354, and therefore of the access area 136, may be maintained. By comparison, if the access area 136 was to have a single radius, a central portion of the access area 136 (e.g. the location of the access area peak 354) may extend toward bores 204 and may be the lowest point of the access area. As a result, more material will be removed from the flange 132 as compared to the amount of material removed for the dual radii access areas 136 of the present application, which may require more machining time, create more waste, and/or reduce the strength of the flange 132. The arcuate portions 350, 352 within the access area 136 are also separated from other access areas. For example, a first flange peak 300A is positioned between the first arcuate portion 350 and an arcuate portion of an adjacent access area, and a second flange peak 300B is positioned between the second arcuate portion 352 and an arcuate portion of another adjacent access area. Thus, the first flange peak 300A and the second flange peak 300B may define an outer boundary of the access area 136. Additionally, a distance between the flange peak 300A, 300B and a midline 304 that bisects the flange 132 (e.g., along the first axis 302) is greater than a distance between the access area peak 354 and the midline 304 such that each flange peak 300 extends farther beyond the midline 304 as compared to extension of the access area 136 from the midline 304. In other words, each flange peak 300A, 300B extends away from the midline 304 and beyond the access area peak 354.

In certain embodiments, the access area 136 having the arcuate portions 350, 352 may more suitably accommodate positioning of the couplers 175 extending through the lip 138 as compared to, for example, an access area having a single arc. As an example, each arcuate portion 350, 352 may be configured to receive/accommodate a respective coupler 175. That is, the first arcuate portion 350 may surround a first coupler 175A, and the second arcuate portion 352 may surround a second coupler 175B. For instance, each arcuate portion 350, 352 may be sized (e.g., have a threshold radius) to accommodate the respective couplers 175A, 175B that are sufficiently sized (e.g., have a threshold diameter) to couple the fluid end 104 and the power end 102 to one another. Indeed, as compared to an access area having a single arcuate portion 370 (e.g., with a single radius), as shown in phantom lines, the access area 136 having multiple arcuate portions 350, 352 may include a space that is more suitably positioned for implementation of the couplers 175.

For instance, a first distance 372 spanning between the flange peaks 300A, 300B formed by the arcuate portions 350, 352 may be greater than a second distance 374 spanning between flange peaks formed by the single arcuate portion 370. In this manner, a dimension (e.g., a width) of the flange peaks 300 may be reduced to accommodate a larger coupler 175. Furthermore, such a space provided by the arcuate portions 350, 352 may enable positioning of a tool 376 used to secure the couplers 175 to the main body 134. By way of example, the tool 376 may extend into the access area 136 at an oblique angle relative to the first axis 302, and the arcuate portions 350, 352 facilitate such positioning of the tool 376 in the access area 136 to avoid contact between the tool 376 and the flange 132, thereby facilitating usage of the tool 376 (e.g., rotation of the tool 376 relative to the flange 132) to implement the couplers 175 to the fluid end 104. In other words, the dual radii of the access area 136 formed by the arcuate portions 350, 352 provides sufficient space to position the tool 376 in the access area 136 for securing the couplers 175 to the main body 134. Although the illustrated tool 376 is a wrench, it should be noted that any other type of tool 376 may extend into the access area 136 and be used to secure the couplers 175 to the main body 134, and the arcuate portions 350, 352 accommodate the positioning of such a tool 376 in the access area 136.

Further still, formation of the separate arcuate portions 350, 352 may increase the amount of material at a certain portion of the flange 132 as compared to an access area having a single, continuous arcuate portion. For example, the presence of the access area peak 354 reduces a void or an amount of material removed to form the access area 136 at the access area peak 354, thereby increasing the amount of material of the flange 132 at the access area peak 354. The increased amount of material may increase the strength of the flange 132, such as by reducing potential stretching of certain portions of the flange 132 and/or reducing concentration of stress at certain portions of the flange 132, and may reduce maintenance to be performed on the fluid end 104. In this manner, the arcuate portions 350, 352 may improve usage of the couplers 175 while maintaining a desirable useful lifespan of the flange 132.

Additionally, although the illustrated access area 136 includes two arcuate portions 350, 352, the access area 136 may include any suitable quantity of arcuate portions, such as three arcuate portions, four arcuate portions, or more than four arcuate portions. In any case, the access area 136 has a multi-scalloped configuration in which the arcuate portions are separated by a respective access area peak 354. Similarly, while the depicted embodiments show arcuate portions 350, 352 with constant radii, other embodiments might include any quantity of arcuate portions with constant or varied radii (e.g., hyperbolic arcuate sections). Additionally, it should be noted that the access area 136 may not be bordered by a flange peaks 300 in some embodiments. For example, the access area 136 may be positioned at an end of the flange 132 and, therefore, a side of the access area 136 may not be adjacent to another access area 136. As such, a flange peak 300 may not be formed at the side of the access area 136.

As discussed herein, in some embodiments, the access area 136 may be formed by a machining process (e.g., milling, drilling, cutting). For instance, the first arcuate portion 350 and/or the second arcuate portion 352 are cutouts formed by removing material. Additionally or alternatively, the access area 136 may be provided by a forming process (e.g., rolling, forging, stamping, pressing). Thus, the first arcuate portion 350 and/or the second arcuate portion 352 may be features provided as a result of deformation of material.

Figure 4A:
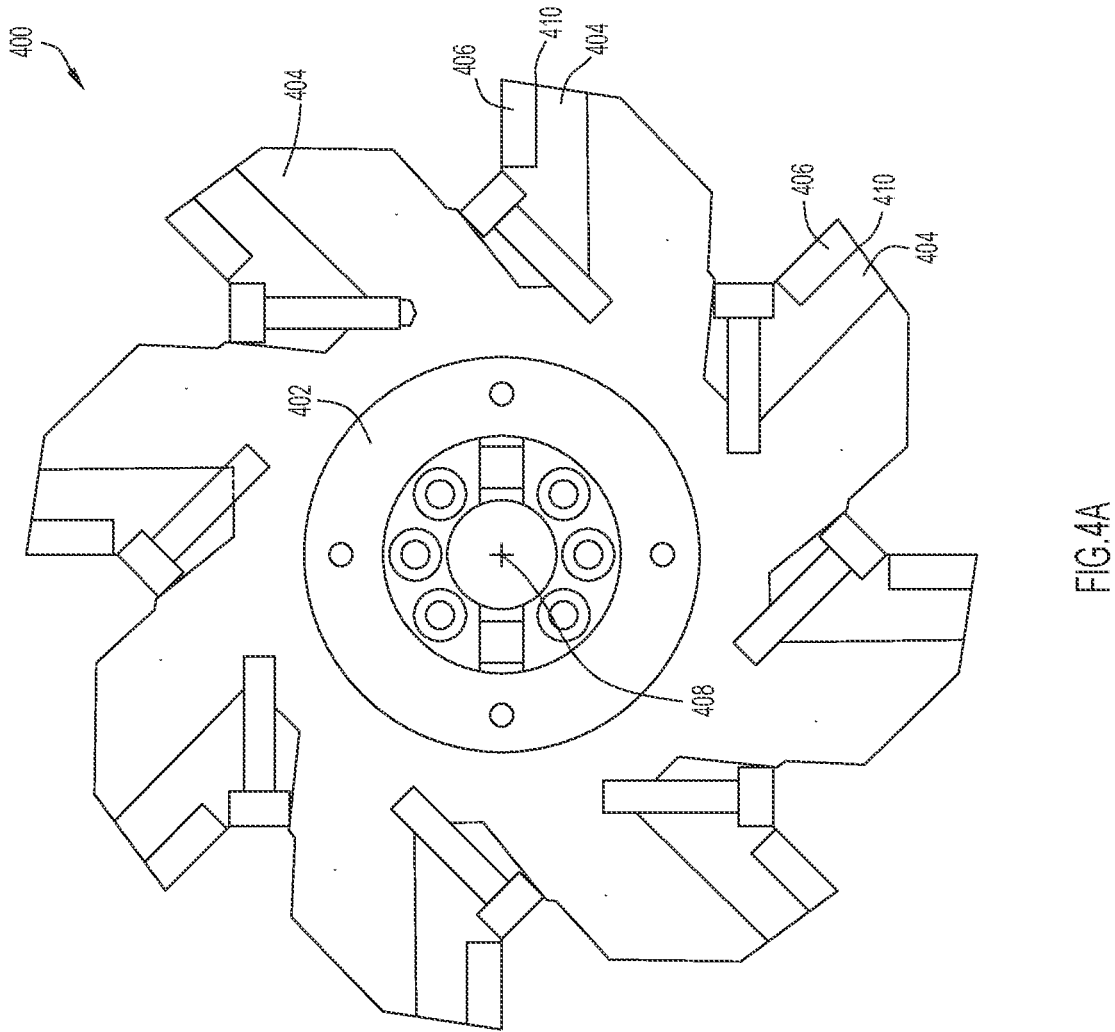
FIG. 4A is a side view of a cutting tool used to manufacture a fluid end, according to an example embodiment of the present application.

FIG. 4A is a side view of a cutting tool 400 that may be used to manufacture the flange 132 of the fluid end 104 (e.g., by using a machining process). The cutting tool 400 includes a hub 402 and a plurality of extensions 404 extending from the hub 402. The illustrated cutting tool 400 includes eight extensions 404 arranged evenly around the hub 402 (e.g., about a circumference of the hub 402). The hub 402 is configured to attach to an arbor (e.g., a shaft, an axle, a spindle) that causes the hub 402, and therefore the extensions 404 attached to the hub 402, to rotate about a rotational axis 408. For instance, the cutting tool 400 may be a disc mill or a portion thereof. Rotation of the extensions 404 at a sufficient speed enables cutting blades/teeth 406 connected to the extensions 404 to remove material from the flange 132. By way of example, the cutting tool 400 is moved relative to the flange 132 while the extensions 404 are rotating and rotation of cutting blades 406 attached to the extensions 404 into engagement with the flange 132 will cause the cutting tool 400 to remove material from the flange 132, e.g., to cut out the access area 136 (e.g., the first arcuate portion 350, the second arcuate portion 352). In order to connect cutting blades 406 (e.g., indexable inserts, removable tips) to the extensions 404, each extension 404 may include a feature 410 (e.g., a receptacle, a mount) configured to removably couple to a cutting tooth.

A size of the cutting tool 400 (e.g., a dimension of the extensions 404, a radius of the hub 402) may be selected based on a desired depth in which the access area 136 is to be cut into the flange 132. For example, the arbor is positioned to extend along (e.g., above or below) the lip 138 to position the cutting tool 400 to form the access area 136, and a sufficiently sized cutting tool 400 is selected to provide sufficient clearance (e.g., a distance between 0.25 centimeters (cm) or 0.1 inches (in) and 1 cm or 0.4 in) between the arbor and the lip 138 or any other part of the flange 132 to prevent the cutting tool 400 from contacting the flange 132, which may detrimentally affect formation of the access area 136. Additionally or alternatively, the size of the cutting tool 400 may be selected based on a desired size of the access area 136 (e.g., a radius of each arcuate portion 350, 352) that can be efficiently formed via movement of the cutting tool 400 relative to the flange 132. However, these dimensions may also be constrained by the size of a magazine of a cutting station with which the cutting tool 400 will be used (e.g., large scale computer numerical control (CNC) cells). In one example, the length of the extensions 404 from the hub 402 is between 20 cm or 8 in and 38 cm or 15 in.

It should be noted that the cutting tool 400 may be used to form the flange 132 via a continual operation. That is, the same cutting tool 400 may form each access area 136 without having to be replaced or having to replace any of the components (e.g., a cutting blade 406) of the cutting tool 400. For this reason, the operation to form the flange 132 may be uninterruptedly or continually performed. As such, the cutting tool 400 may improve efficiency or speed of operation to form the flange 132.

Figure 4B:
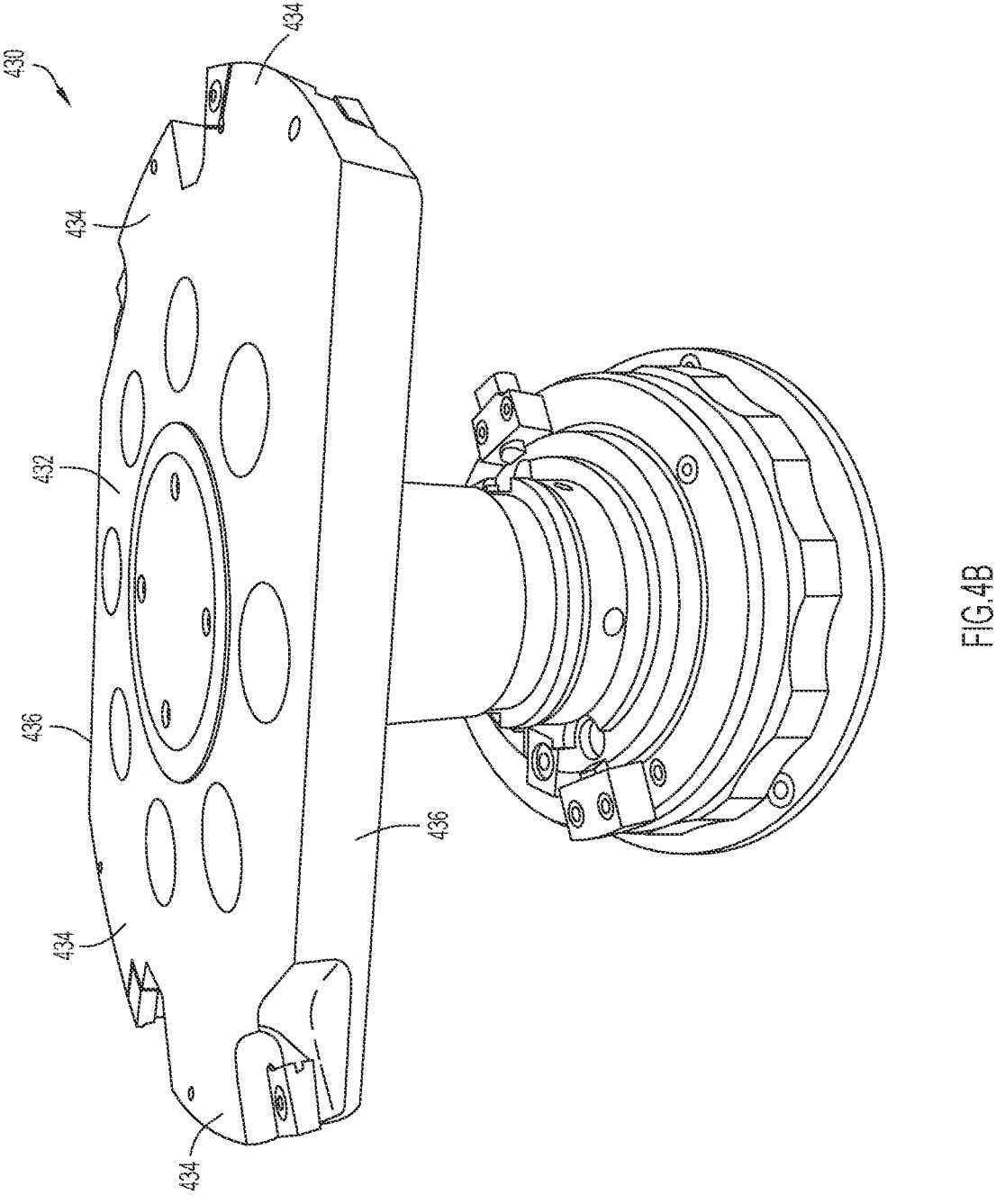
FIG. 4B is a side view of a prior art cutting tool used to manufacture a fluid end.

By comparison, conventional cutting tools often cannot form all of the access areas for a single fluid end in one pass and will often require maintenance while working on a single fluid end, e.g., to change the cutting blades of the cutting tools. FIG. 4B is a side view of a prior art cutting tool 430. The prior art cutting tool 430 includes a hub 432 and a plurality of extensions 434 extending from the hub 432. Cutting blades may be coupled to the extensions 434. However, unlike the cutting tool 400, the extensions 434 of the prior art cutting tool 430 are not evenly arranged an entire perimeter (e.g., circumference) around the hub 432. Instead, the prior art cutting tool 430 includes planar portions 436 that are devoid of any extensions 434 and generally do not engage the fluid end to remove material.

The illustrated prior art cutting tool 430 includes two planar portions 436 positioned at opposite ends of the prior art cutting tool 430, but in other embodiments, the prior art cutting tool 430 may include any quantity of planar portions 436 that are devoid of extensions 434. As such, the prior art cutting tool 430 may include fewer extensions 434 (e.g., four extensions 434) than a quantity of the extensions 404 of the cutting tool 400, and/or a size of the extensions 434 of the prior art cutting tool 430 may be smaller than a size of the extensions 404 of the cutting tool 400. Therefore, there may also be relatively fewer or smaller cutting teeth implemented in the prior art cutting tool 430. Consequently, the cutting teeth and/or extensions 434 used to remove material may be more subject to wear.

For example, during operation of the prior art cutting tool 430 to remove material from a fluid end, the cutting blades and/or extensions 434 may be worn to an extent such that the prior art cutting tool 430 may no longer effectively remove material, may change geometry of the fluid end upon further engagement with the fluid end (e.g., create a defect), and/or otherwise may negatively affect removal of material from the fluid end. Thus, with the prior art cutting tool 430, a maintenance operation (e.g., to repair or replace the cutting blades and/or extensions 434) may be performed before the prior art cutting tool 430 has formed all of the access areas of the fluid end, and operation of the prior art cutting tool 430 to remove material is interrupted. For this reason, completed manufacture of the fluid end may be delayed, reducing production efficiency and/or increasing costs (e.g., to due to downtime during maintenance of prior art cutting tool 430 and/or the fluid end.

Figure 5A:
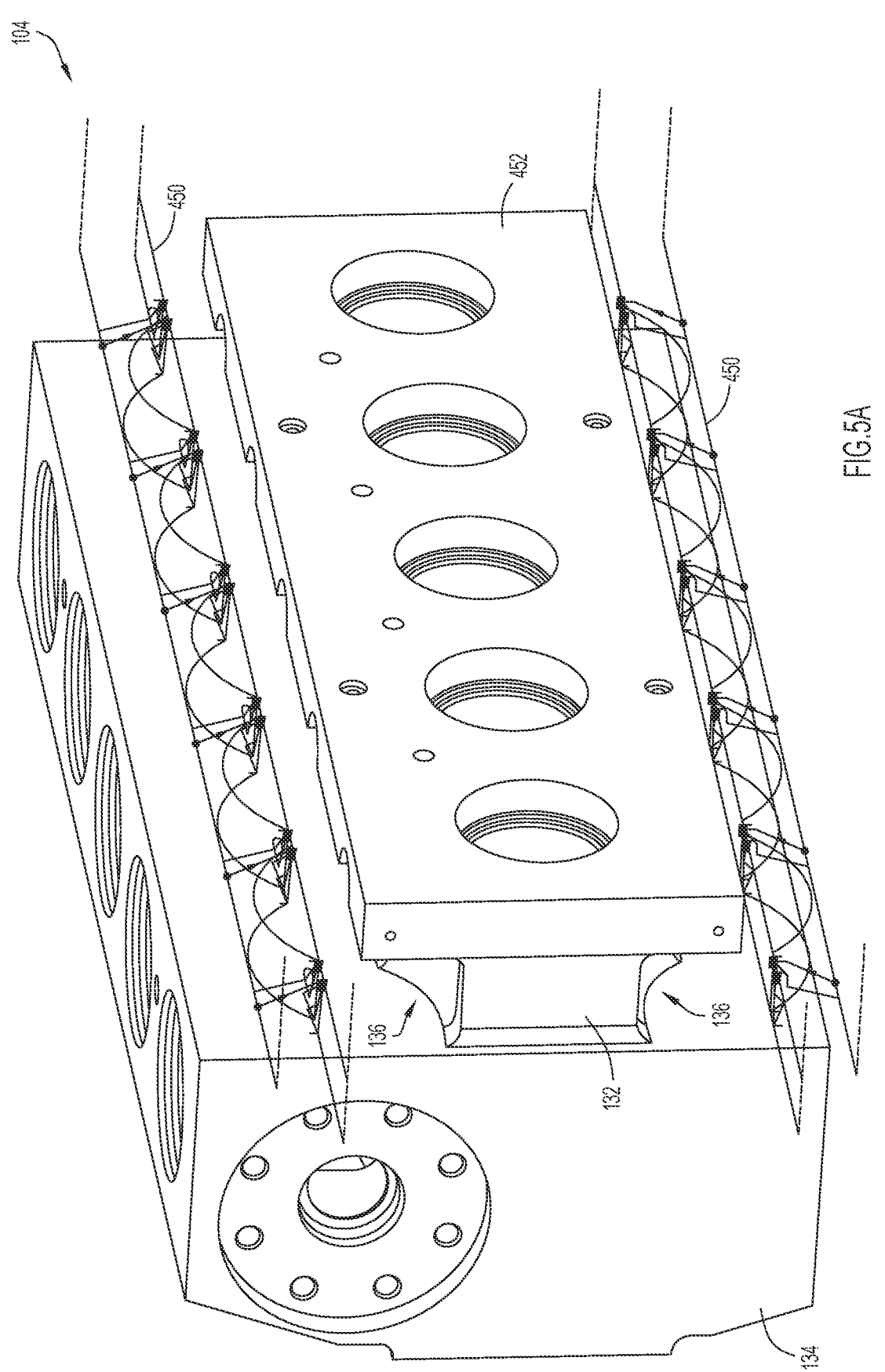
FIG. 5A is a perspective view of a fluid end illustrating a movement path of a cutting tool to manufacture the fluid end, according to an example embodiment of the present application.

FIG. 5A is a perspective view of the fluid end 104. FIG. 5A also illustrates a movement path 450 of the cutting tool 400 to form the access areas 136. As an example, the movement path 450 indicates positioning of the rotational axis 408 around which the cutting tool 400 rotates to cause the cutting tool 400 (e.g., the cutting blades 406 extending from extensions 404) to engage the flange 132 and remove material. For instance, the cutting tool 400 is positioned between the main body 134 and a distal surface 452 of the flange 132 and directed along the movement path 450 to form the access areas 136, along with the access area peaks 300, between the main body 134 and the distal surface 452. As discussed herein, the same cutting tool 400 may be used to form each access area 136 of the flange 132. For this reason, the same cutting tool 400 may be directed along the entirety of the movement path 450. However, in additional or alternative embodiments, different cutting tools (e.g., having the same or a different embodiment as the cutting tool 400) may be directed along different portions of the movement path 450 such that multiple cutting tools are used to form the access areas 136 of the flange 132. In certain embodiments, the cutting tool 400 is automatically moved along the movement path 450, such as via a CNC machine.

Figure 5B:
FIG. 5B is a front view of the fluid end of FIG. 5A illustrating a portion of the movement path of the cutting tool to manufacture the fluid end.

FIG. 5B is a front view of the fluid end 104, as well as of the movement path 450 of the cutting tool 400. The illustrated movement path 450 includes multiple first paths 500 and second paths 502. Each first path 500 is curved and overlaps with one of the first bores 204 along the first axis 302. But, the first paths 500 are separated by the second paths 502. Thus, at a high-level, the cutting tool 400 moves from one of the second paths 502, along the first path 500 in a direction curvedly away from the midline 304, and to another one of the second paths 502.

Movement of the cutting tool 400 along one of the first paths 500 forms portions of two adjacent access areas 136 and one of the flange peaks 300. In fact, in at least some instances, the most distal portion of paths 500 may move the cutting tool 400 out of engagement with the flange 132 and into a space above the flange 132 to leave a flat surface atop the flange 132 and form the flange peaks 300. Meanwhile, each second path 502 extends between adjacent first bores 204 along the first axis 302. Thus, movement of the cutting tool 400 along one of the second paths 502 forms an access area peak 354 between the first arcuate portion 350 and the second arcuate portion 352 in one of the access areas 136.

In the depicted embodiment, each second path 502 includes a first portion 504 and a second portion 506. Additionally, each second path 502 includes an intermediate portion 508 along which the cutting tool 400 moves to transition between the first portion 504 and the second portion 506. The intermediate portion 508 may include a jump, a zigzag, or a wave-like movement. In any case, movement of the cutting tool 400 along the intermediate portion 508 forms the access area peak 354 between the first arcuate portion 350 and the second arcuate portion 352. As such, incorporation of the intermediate portion 508 creates the discontinuity of the first arcuate portion 350 relative to the second arcuate portion 352 and ensures that the access area 136 includes multiple radii. In some embodiments, the cutting tool 400 moves directly from a first path 500 to a second path 502, and/or vice versa, to move continually along the movement path 450 to form multiple access areas 136.

Figure 5C:
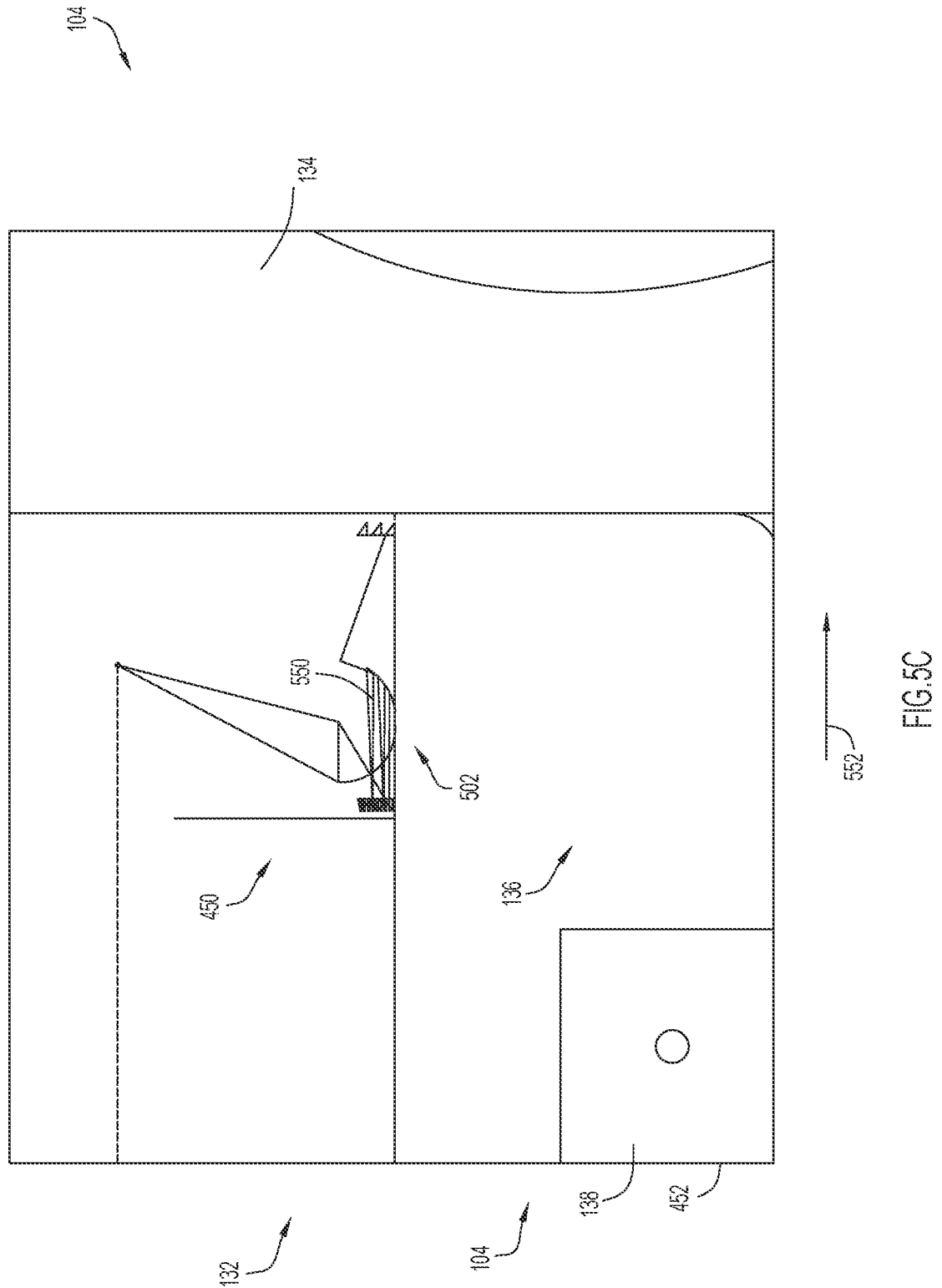
FIG. 5C is a side view of the fluid end of FIG. 5A illustrating a portion of the movement path of the cutting tool to manufacture the fluid end.

FIG. 5C is a side view of the fluid end 104 illustrating the movement path 450 of the cutting tool 400. In particular, the movement path 450 includes the second path 502, such as one of the first portion 504 or the second portion 506, used to form at least part of the access area 136 between the lip 138 of the flange 132 and the main body 134. As shown in FIG. 5C, the second path 502 includes multiple passes 550 of the cutting tool 400 generally along a second axis 552 (e.g., a second horizontal axis, a longitudinal axis) that extends parallel to the central axes 510 of the first bores 204. That is, the cutting tool 400 moves repeatedly toward and away from the main body 134 along the second path 502. These passes 550 enable the cutting tool 400 to iteratively remove material of the flange 132 to create a smooth surface of one of the arcuate portions 350, 352.

As discussed herein, a cutting tool 400 having a particular diameter may be selected to form an access area 136 having a target radius or depth. For example, the arbor to which the cutting tool 400 is attached extends over the lip 138 to position the cutting tool 400 between the distal surface 452 of the flange 132 and the main body 134, and a particularly sized cutting tool 400 may be selected to provide sufficient clearance between the arbor and the flange 132 (e.g., the lip 138) while enabling a desirably sized access area 136 to be efficiently cut out between the main body 134 and the lip 138.

Figure 6:
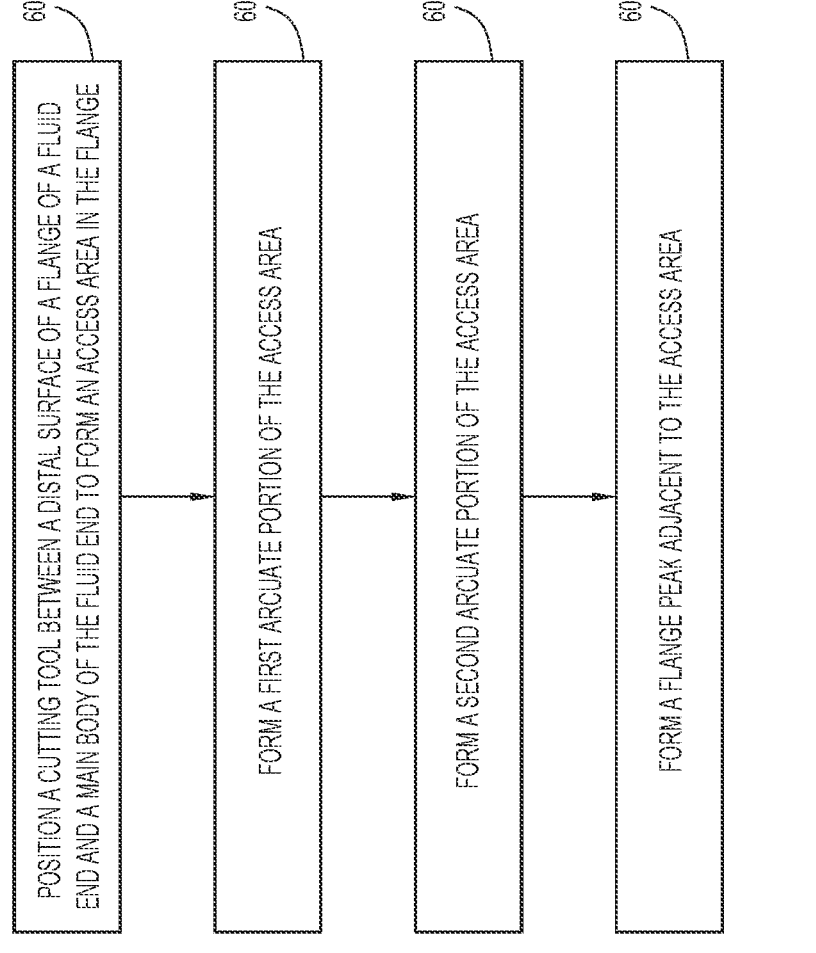
FIG. 6 is a flowchart of a method of manufacturing a fluid end of a reciprocating pump, according to an example embodiment of the present application.

FIG. 6 is a method 600 of manufacturing the fluid end 104. In particular, the method 600 depicts machining of the fluid end 104 to form one of the access areas 136. It should be noted that the method 600 may be performed differently in additional or alternative embodiments. For example, an additional operation may be performed, and/or any of the operations of the method 600 may be performed differently, performed in a different order, or removed altogether.

At block 602, the cutting tool 400 is positioned between the distal surface 452 of the flange 132 and the main body 134 to form the access area 136 in the flange 132. For example, the cutting tool 400 is attached to an arbor, and the arbor is positioned to extend over the flange 132 (e.g., past the distal surface 452, over the lip 138) to position the cutting tool 400 between the distal surface 452 and the main body 134.

At block 604, the first arcuate portion 350 of the access area 136 is formed via the cutting tool 400. By way of example, the cutting tool 400 can operate to rotate about the arbor, and the arbor is directed along a portion of the first path 500 of movement path 450 to engage the extensions 404 and/or the cutting blades 406 of the cutting tool 400 against the flange 132. This engagement will remove material from the flange 132 to form the first arcuate portion 350. Thus, the first arcuate portion 350 is cut out from the flange 132. The cutting tool 400 may be moved along multiple passes 550 and repeatedly moved toward and away from the main body 134 to form the first arcuate portion 350.

At block 606, the second arcuate portion 352 of the access area 136 is formed via the cutting tool 400. For example, the arbor is directed along the intermediate portion 508 of the second path 502 to initiate formation of the second arcuate portion 352, and the arbor is then directed along a portion of an additional first path 500 (different from the first path of block 604) to cut out the second arcuate portion 352 from the flange 132. Thus, the access area peak 354 is positioned between the first arcuate portion 350 and the second arcuate portion 352. Similar to formation of the first arcuate portion 350, the cutting tool 400 may be moved along multiple passes 550 and repeatedly moved toward and away from the main body 134 to form the second arcuate portion 352. Formation of the first arcuate portion 350 and of the adjacent second arcuate portion 352 subsequently provides the access area peak 354 between the first arcuate portion 350 and the second arcuate portion 352.

At block 608, the flange peak 300 is formed adjacent to the access area 136. To this end, the arbor is directed further along the first path 500 from block 608 (e.g., in a curved direction away from the midline 304 of the flange 132). The flange peak 300 defines an outer boundary of the access area 136. After forming the flange peak 300, the arbor may be directed to form another access area 136, such as by directing the arbor along the remainder of the first path 500 traversed at block 608 such that the flange peak 300 is positioned between the access areas to separate the access areas 136 from one another.

In some embodiments, the material of the flange 132 may be pre-stressed to facilitate formation of the access area 136. For example, the flange 132 may be composed of a metal, and pre-stressing the metal may stretch or deform the metal to a limit (e.g., a threshold strain). Further stretching of the metal beyond the limit via an additionally applied force (e.g., the cutting tool 400 to remove material) may be avoided. That is, stretching of the metal at the limit may be maintained despite application of an additional force. Thus, engagement of the cutting tool 400 with the metal while the metal is stretched may enable the cutting tool 400 to remove material instead of, for example, undesirably stretching the metal (e.g., without removing material), which may affect the manner in which the access area 136 is formed. As such, the access area 136 may be more precisely formed by pre-stressing the metal.

In further embodiments, the access area 136 may be formed in a different manner. As an example, material may be removed by directing the cutting tool 400 in a different movement path and/or by using a different machining technique altogether. As another example, the access area 136 may be formed by a forming process in which material is deformed without being removed. Indeed, any suitable process may be performed to provide the flange 132 having the access area 136 with multiple arcuate portions 350, 352 that are discontinuous from one another.

While the disclosure has been illustrated and described in detail and with reference to specific embodiments thereof, it is nevertheless not intended to be limited to the details shown, since it will be apparent that various modifications and structural changes may be made therein without departing from the scope and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Similarly, it is intended that the present disclosure cover the modifications and variations of this disclosure that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present disclosure to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the disclosure.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

What is claimed is:

1. A method of manufacturing a flanged fluid end of a reciprocating pump, the flanged fluid end comprising a main body and a flange extending from the main body, wherein the method comprises:

positioning a cutting tool between a distal surface of the flange and the main body of the flanged fluid end so that the cutting tool can form an access area in the flange;

forming, with the cutting tool, a first arcuate cutout of the access area; and forming, with the cutting tool, a second arcuate cutout of the access area, the second arcuate cutout being discontinuous with the first arcuate cutout so that the access area includes multiple radii.

2. The method of claim 1, comprising: forming, with the cutting tool, an access area peak within the access area, between the first arcuate cutout and the second arcuate cutout.

3. The method of claim 2, wherein forming the first arcuate cutout comprises directing the cutting tool along a first portion of a path, forming the second arcuate cutout comprises directing the cutting tool along a second portion of the path, and forming the access area peak within the access area comprises directing the cutting tool along an intermediate portion of the path between the first portion and the second portion.

4. The method of claim 3, wherein the intermediate portion comprises a jump, a zigzag, or a wave-like movement of the cutting tool.

5. The method of claim 1, comprising: forming, with the cutting tool, a flange peak adjacent to the access area.

6. The method of claim 5, wherein forming the flange peak comprises moving the cutting tool along a curved path.

7. The method of claim 5, comprising:

positioning the cutting tool between the distal surface of the flange and the main body of the flanged fluid end so that the cutting tool can form an additional access area in the flange such that the flange peak is positioned between the access area and the additional access area;

forming, with the cutting tool, a third arcuate cutout of the additional access area; and forming, with the cutting tool, a fourth arcuate cutout of the additional access area.

8. The method of claim 1, wherein the flanged fluid end comprises a bore extending through the flange, and forming the first arcuate cutout, the second arcuate cutout, or both comprises moving the cutting tool in a direction parallel to a central axis extending through a center of the bore.

9. The method of claim 8, wherein moving the cutting tool in the direction parallel to the central axis extending through the center of the bore comprises repeatedly moving the cutting tool toward and away from the main body of the flanged fluid end.

10. The method of claim 1, wherein the access area is accessible from an exterior of the flanged fluid end while the flanged fluid end is assembled.

11. The flanged fluid end manufactured using the method of claim 1.

12. A method of manufacturing a flanged fluid end of a reciprocating pump, the flanged fluid end comprising a main body and a flange extending from the main body, wherein the method comprises:

forming a first arcuate portion of an access area in the flange;

forming an access area peak of the access area in the flange;

forming a second arcuate portion of the access area in the flange such that the access area peak separates the first arcuate portion and the second arcuate portion from one another; and forming a flange peak adjacent to the access area in the flange.

13. The method of claim 12, wherein forming the first arcuate portion, the second arcuate portion, or both comprises moving a cutting tool toward and away from the main body to remove material from the flange.

14. The method of claim 12, comprising forming a third arcuate portion of an additional access area in the flange, wherein the flange peak is positioned between the second arcuate portion of the access area and the third arcuate portion of the additional access area.

15. The method of claim 12, wherein the first arcuate portion is formed to have a first radius, the second arcuate portion is formed to have a second radius, and the first radius and the second radius are equal to one another.

16. The flanged fluid end manufactured using the method of claim 12.

* * * * *